United States Patent [19]

Gilliland et al.

[11] Patent Number: 4,922,161
[45] Date of Patent: May 1, 1990

[54] METHOD AND APPARATUS FOR IMPROVING THE REGULATION OF THE SPEED OF A MOTOR

[75] Inventors: Malcolm T. Gilliland, 310 Pine Valley Rd., Marietta, Ga. 30067; Charles L. Warner, II, Stone Mountain, Ga.

[73] Assignee: Malcolm T. Gilliland, Peachtree City, Ga.

[21] Appl. No.: 332,340

[22] Filed: Mar. 31, 1989

[51] Int. Cl.$^5$ ............................................. H02P 3/12
[52] U.S. Cl. ................................ 318/269; 318/273; 318/375; 318/379
[58] Field of Search ............... 318/255, 256, 257, 258, 318/261, 268, 269, 273, 362, 363, 366, 368, 370, 375, 379; 388/803, 804, 809, 811, 816, 819, 829, 831

[56] References Cited

U.S. PATENT DOCUMENTS

| | | | |
|---|---|---|---|
| 3,582,747 | 6/1971 | Kearns | 318/379 |
| 3,590,352 | 6/1971 | Ries | 318/258 X |
| 3,599,064 | 8/1971 | Friedman | 388/804 |
| 3,715,642 | 2/1973 | Walter | 318/269 X |
| 4,275,341 | 6/1981 | Huber et al. | 318/375 X |
| 4,309,644 | 1/1982 | Reimers et al. | 318/251 X |
| 4,384,240 | 5/1983 | Sloan | 318/255 |
| 4,388,573 | 6/1983 | Horiuchi et al. | 318/269 X |
| 4,494,058 | 1/1985 | Berti | 318/254 X |

FOREIGN PATENT DOCUMENTS

| | | | |
|---|---|---|---|
| 55-26080 | 2/1980 | Japan | 318/375 |
| 59-103501 | 6/1984 | Japan | 318/375 |
| 0714603 | 2/1980 | U.S.S.R. | 318/375 |
| 0989718 | 1/1982 | U.S.S.R. | 318/375 |
| 1177071 | 1/1970 | United Kingdom | 318/364 |

Primary Examiner—Bentsu Ro
Attorney, Agent, or Firm—Jones, Askew & Lunsford

[57] ABSTRACT

An automatic braking and speed control for a device driven by an electric motor. A controller provides a pulsed output voltage having a pulse width dependent upon the load seen by the motor (16). When the drive pulses are present two diodes (52,54) and a transistor (66) serve to maintain a power transistor (56) in the off condition. When the controller is not providing drive pulses and the motor (16) is being turned by the momentum of the mechanical device or by some outside force, such as gravity, the motor (16) functions as a generator and turns on two transistors (56,67) so that two resistors (51a,51b) apply a load to the generator (16). This provides a braking action between the output pulses so that the net speed of the motor (16) and its associated mechanical device is more dependent upon the output pulses provided by the controller. A shunting diode (42), in conjunction with two resistors (51a,51c) provides a braking mechanism in the event that the motor (16) should begin turning in a direction reverse to that desired. A switch (64) allows reversing the polarity of the voltage provided to the motor (16) so that the motor (16) may be made to run in a clockwise or a counter-clockwise direction, as desired. The result is an apparatus which can be easily retrofit onto existing systems so as to provide for automatic braking and improved speed control for a device driven by an electric motor.

27 Claims, 5 Drawing Sheets

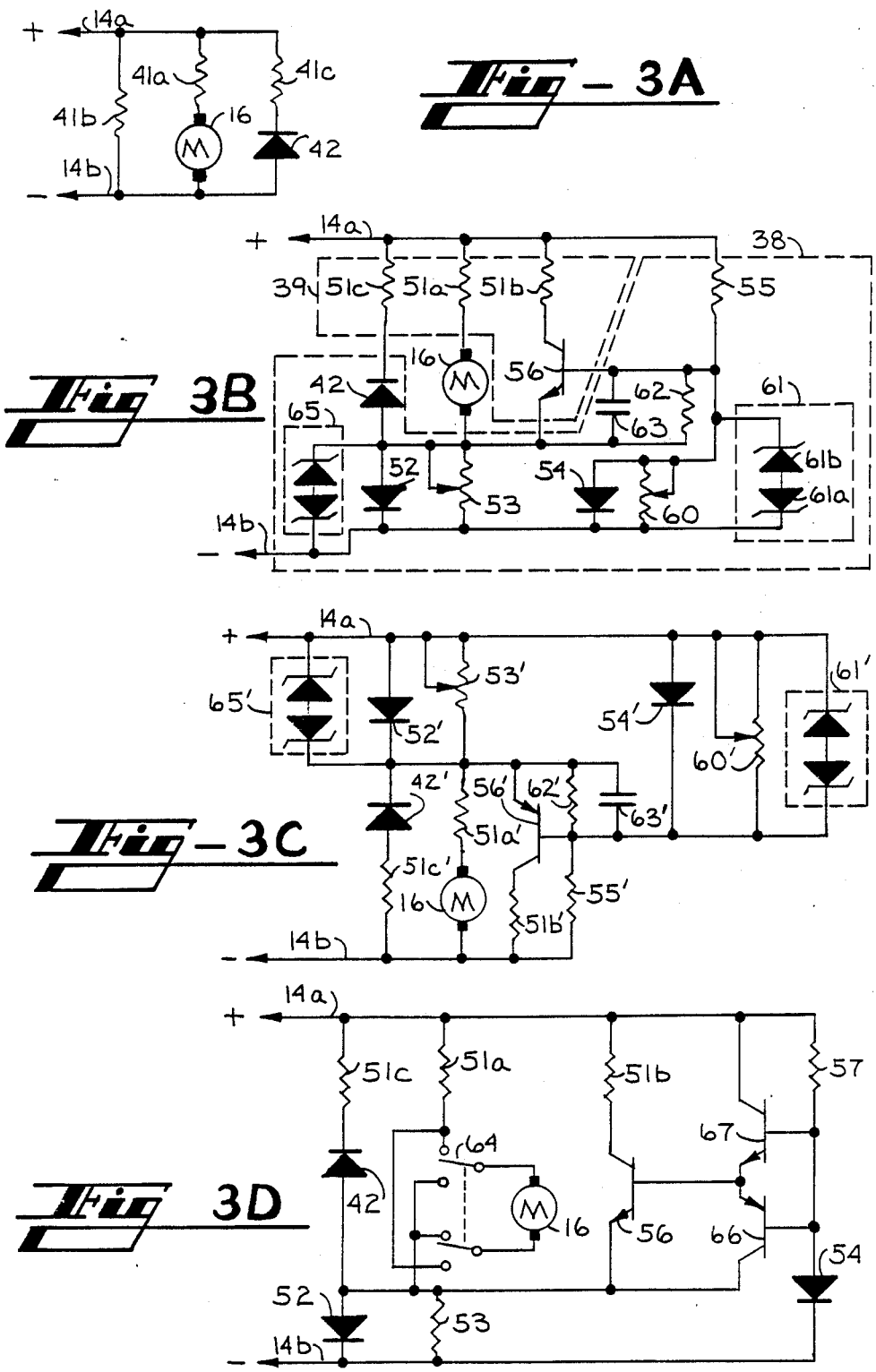

METHOD AND APPARATUS FOR IMPROVING THE REGULATION OF THE SPEED OF A MOTOR

TECHNICAL FIELD

The present invention relates to motor braking and speed control devices for orbital welders and more particularly to the regulation of motor speed when the load on the motor is changing.

BACKGROUND OF THE INVENTION

FIG. 1 is an illustration of a typical prior art orbital welding system and environment. A controller 10 provides feed speed, motor speed, and arc control signals to a welding carriage 11. Welding carriage 11 typically comprises a set of wheels 21a and 21b, at least one of which is driven by a motor (M) 16, and a welding head 17, which includes a wire feed speed mechanism (not shown) for feeding the wire or rod 20 during the welding operation. Cables 13 and 14 provide the feed speed control and motor control signals, respectively, to the welding head 17 and the motor 16, respectively. Cable 15 provides the arc welding voltage to rod 20 via welding head 17 and to the workpiece 12. In a typical environment, workpiece 12 will consist of two sections of pipe which are to be joined together. In FIG. 1, workpiece 12 represents the two sections of pipe as seen looking down the axis of the pipes. Controller 10 and welding carriage 11 operate to lay down a welding bead along the circumference of the workpiece 12 at the point where the two sections are joined together. Welding carriage 11 also comprises an opposing piece (not shown), located on the other side of workpiece 12, which provides a counterbalance for welding carriage 11 and which also serves to firmly hold the welding carriage 11 against the workpiece 12. Construction and operation of a typical controller 10 and welding carriage 11 are well known to those skilled in the art. Although the controller 10 is shown separate from the welding carriage 11 in FIG. 1, controller 10 is frequently mounted inside of the welding carriage 11.

It will be noted that, as welding carriage 11 moves around the circumference of the workpiece 12 in a clockwise direction, the welding carriage 11 will be first going uphill, then level, then downhill, then level, then uphill, etc. It is preferred that the welding seam and fill be uniform around the circumference of the workpiece 12. If the welding fill is being deposited at a fixed rate, then a faster speed will result in less fill in a given length and a slower speed will result in more fill. Therefore, the welding carriage 11 should move at a constant speed about the circumference of workpiece 12, regardless of whether welding carriage 11 is going uphill, downhill, or level. In order to achieve this a typical controller 10 will monitor the current draw of motor 16, the reverse voltage (back EMF) generated by a motor 16, or both, and provide a pulsed output voltage to motor 16 over cable 14.

FIG. 2 shows a typical output voltage pulse train provided to motor 16 by controller 10 as welding carriage 11 moves around the circumference of workpiece 12. As welding carriage 11 is moving uphill, motor 16 must provide sufficient power to overcome the inherent friction of movement of welding carriage 11 plus the effects of gravity. Therefore, controller 10 will provide pulses 30 having a long duty cycle. As welding carriage 11 moves to the top of workpiece 12 it assumes a more level orientation and motor 16 need provide only enough power to overcome the friction of movement of welding carriage 11. Therefore, controller 10 provides pulses 31 which have a smaller duty cycle. Then, as welding carriage 11 proceeds further along the circumference of workpiece 12 it will begin moving downhill and the movement of welding carriage 11 will be assisted by gravity. Therefore, to maintain a constant speed for welding carriage 11, controller 10 further reduces the pulsewidth of the pulses 32 so that the drive power of motor 16 and gravity 10 combine to keep welding carriage 11 moving at the same speed. Therefore, by sensing the back EMF and/or the current drain of motor 16, controller 10 adjusts the duty cycle, voltage amplitude, and/or the frequency of the pulses provided to motor 16 in a manner which tends to counteract the force of gravity and the friction of movement of welding carriage 11 so as to maintain a constant speed for welding carriage 11 as it travels around the circumference of workpiece 12.

Although this method of regulating the speed of welding carriage 11 does tend to promote a more uniform weld, there is still substantial room for improvement. In particular, the friction of movement of welding carriage 11 may provide insufficient braking force to maintain a constant speed going downhill even when controller 10 provides reduced pulsewidth pulses 32 or even no output pulses at all. In order to maintain better speed control some welding carriages 11 provide braking mechanisms for the wheels 21. In order to provide for sufficient braking force and provide better speed regulation, some welding carriages add a brake or clutch, which is applied at all times, so that the motor loading or unloading effect caused by going uphill or downhill, respectively, is insignificant when compared to the load provided by the brake. Of course, the motor must have sufficient power to overcome the brake loading and still move the welding carriage 11 uphill.

Also, in order to more precisely regulate the speed of welding carriage 11, some systems provide a tachometer (not shown) in conjunction with motor 16 so that controller 10 may monitor the exact speed of motor 16 and adjust the output pulsewidth accordingly. However, these techniques increase the cost, weight, and/or complexity of the controller 10/welding carriage 11 combination. Furthermore, there is generally no practical way to retrofit a braking mechanism or a tachometer into a previously existing system.

Therefore, there is a need for a speed control system for a welding carriage which will provide a uniform speed regardless of whether the welding carriage is going uphill, downhill, or level.

There is also a need for a speed control system which can be easily retrofit into an existing system.

There is also a need for a speed control system which can provide a more uniform welding speed at a low cost.

There is also a need for an automatic braking device which applies a braking force when the welding carriage rolls in a reverse direction.

There is also a need for an automatic braking device which can be easily retrofit into an existing system.

SUMMARY OF THE INVENTION

The present invention provides a method and apparatus for maintaining a more constant speed for the welding carriage. This is obtained by using the motor as a braking device so that the motor is functioning as a motor when drive power is being applied and functioning as a brake when drive power is not being applied. When drive power is not being applied to the motor the momentum of the welding carriage and/or the force of gravity tend to keep the welding carriage moving. Since the motor is coupled to the wheels of the welding carriage, the movement of the welding carriage causes the motor to turn and generate a voltage across the motor terminals. To provide braking, the motor terminals are connected to one or more load resistors or a short circuit so that the motor functions as a generator. When the motor is functioning as a generator it acts as a braking device which reduces the speed of the welding carriage. Furthermore, braking is automatically applied when said carriage is moving in a reverse direction.

Therefore, the present invention describes a method and apparatus for sensing whether a motor is driving the device or is being driven by the device and, if the motor is being driven by the device, a method and apparatus for using the motor to provide braking for the device. In one embodiment of the present invention, a sensing device determines whether current is tending to flow into or out of the motor so as to ascertain whether the motor is driving the device or is being driven by the device, respectively. In another embodiment of the present invention, a first sensing device determines the direction of the current flow, a second device determines the polarity of the voltage across the motor, and a logic circuit determines whether the motor is driving the welding carriage or is being driven by the welding carriage. If the motor is being driven by the welding carriage, then the present invention uses a transistor to short the motor terminals together so that the motor functions as a generator and provides a braking action for the welding carriage.

Therefore, it is an object of the present invention to provide a method and apparatus for controlling the speed of a welding carriage by using the drive motor as a braking mechanism.

It is a further object of the present invention to provide an apparatus for controlling the speed of a welding carriage which can be retrofit onto an existing speed control system and welding carriage system by using the drive motor as a braking device.

It is a further object of the present invention to provide a method and apparatus for controlling the speed of a welding carriage and which absorbs little or no drive power when the drive motor is being powered but does absorb power when the motor is functioning as a generator.

It is a further object of the present invention to automatically provide a braking force when said welding carriage is moving in a reverse direction.

It is a further object of the present invention to provide a method and apparatus for determining whether a motor is driving a device or is being driven by a device and, if the motor is being driven by the device, for using the motor to provide a braking action for the device.

It is a further object of the present invention to determine whether a motor is driving a device or is being driven by a device by monitoring the direction of the current flow through the motor and the polarity of the voltage developed across the motor.

BRIEF DESCRIPTION OF THE DRAWING

FIG. 3A is a schematic diagram of a simple embodiment of the present invention.

FIGS. 3B through 3F are schematic diagrams of other embodiments of the present invention.

DETAILED DESCRIPTION

Figure 1:
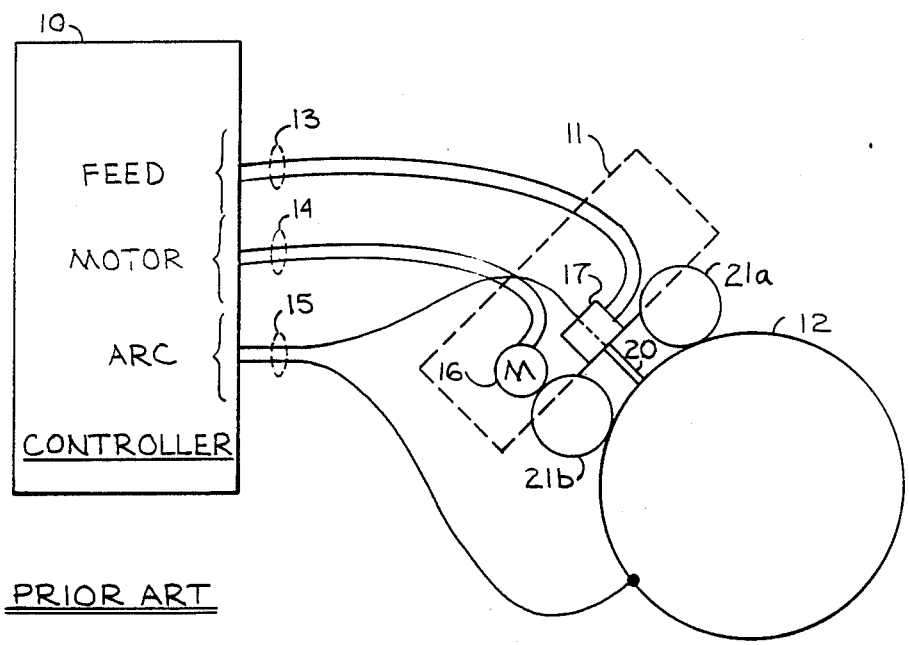
FIG. 1 is an illustration of a typical prior art welding system and environment.
Figure 2:
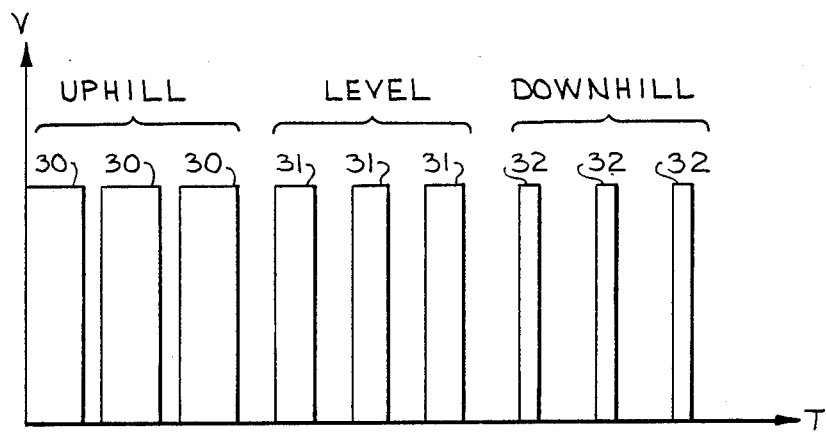
FIG. 2 is an illustration showing the output of a prior art controller.

Turn now to the drawing in which like numerals represent like components throughout the several figures. FIGS. 1 and 2, which depict the prior art, are described in the Background of the Invention, above. FIG. 3A is a simple embodiment of the present invention. Positive conductor 14a is connected to negative conductor 14b through load resistor 41b, through the series combination of load resistor 41a and direct current motor 16, and through the series combination of load resistor 41c and diode 42. Diode 42 is oriented so as to be reverse biased when conductor 14a is positive with respect to conductor 14b. Conductors 14a and 14b are part of cable 14 which goes to the motor control output of controller 10 (FIG. 1). Resistors 41 and diode 42 may be located anywhere between controller 10 and motor 16 but are preferably located near motor 16 in welding carriage 11 (FIG. 1). When controller 10 is providing an output voltage motor 16 is powered through resistor 41a. Note that resistor 41b also absorbs a portion of the drive power provided by controller 10. It will be noted that when controller 10 is providing drive power that diode 42 is reverse biased and resistor 41c does not absorb power. Typically, when a controller 10 is not providing output power to the motor 16 the controller 10 presents an open circuit to the motor 16. During this period some controllers 10 monitor the back EMF generated by motor 16 to determine the speed at which the welding carriage 11 is moving. When controller 10 is not providing drive power to the motor 16 the momentum of welding carriage 11 and/or the effects of gravity tend to cause motor 16 to rotate in the same direction as when it was being powered by controller 10. Motor 16 then functions as a generator and provides an output voltage and an output current to resistors 41a and 41b. Resistors 41a and 41b absorb the power presented by this generated voltage which, accordingly, causes motor 16 to act as a brake and slow welding carriage 11. If the welding carriage 11 should tend to stop and roll in the reverse direction then the polarity of the voltage generated by motor 16 will reverse and diode 42 will be forward biased. In this case, resistors 41a, 41b and 41c will tend to absorb power generated by motor 16 and provide additional braking so as to prevent or slow the reverse movement of welding carriage 11. All resistors 41 are not essential. If the output of controller 10 provides an open circuit when it is not providing drive power then resistor 41a can be eliminated. If the controller 10 provides a short circuit or a very low resistance when not providing drive power then resistor 41b could be eliminated since resistor 41b would not be required in order to provide a continuous path for the current flowing through motor 16 when motor 16 is functioning as a generator. In either case, if there is no concern that welding carriage 11 will roll in a reverse direction then diode 42 and resistor 41c may be eliminated since these components are only active when motor 16 is being turned in a direction reverse to its normal direction. Furthermore, with some controller, the speed regulation is better if diode 42 and resistor 41c are eliminated.

FIG. 3B is another embodiment of the present invention. It has the advantage in that it absorbs very little power from controller 10 when controller 10 is providing drive power to motor 16. This is accomplished by selectively switching in a load resistor, such as resistor 51b, only when drive power is not being provided by controller 10. Positive conductor 14a is connected to one end of resistors 51a, 51b, 51c and 55, which preferably have values of 0, 0, infinity, and 26 ohms, respectively. The other end of resistor 51c is connected to the cathode of optional diode 42. The anode of diode 42 is connected to the anode of diode 52, one end of motor 16, one end of resistor 53, and the emitter of an NPN transistor 56 such as the 2N5631, 2N5686, or MJ10000 transistor. The other end of resistor 51a is connected to the other end of motor 16. The other end of resistor 51b is connected to the collector of transistor 56. The other end of resistor 55 is connected to the base of transistor 56 and the anode of diode 54. Negative conductor 14b is connected to the cathode of diodes 52 and 54 and the other end of resistor 53. When controller 10 is providing drive power then diode 42 will be reverse biased and current will flow through resistor 51a, motor 16, and diode 52. In addition, some current will flow through resistor 53, the amount of that current being determined by the voltage drop across diode 52 and the resistance of resistor 53. Also, some current will flow through resistor 55 and diode 54. The voltage drop across diode 54 should be less than or equal to the voltage drop across diode 52 so that the base of transistor 56 is at approximately the same voltage as, or at a lesser voltage than, the emitter of transistor 56, thereby turning off transistor 56. Since transistor 56 is turned off, no current flows through resistor 51b. Therefore, in contrast to the circuit of FIG. 3A, in which resistor 41b draws power when drive power is being applied, resistor 51b of FIG. 3B does not absorb power when controller 10 is providing drive power to motor 16.

Assume now that controller 10 is between output pulses and essentially presents an open circuit between conductors 14a and 14b. The momentum of welding carriage 11 and/or the force of gravity will cause motor 16 to continue turning in the same direction thereby making the end of motor 16 connected to resistor 51a positive with respect to the end of motor 16 connected to the emitter of transistor 56. Current will flow from motor 16, now acting as a generator, through resistor 51a, through resistor 55, through the base-emitter junction of transistor 56, and back to motor 16. This forward biases the base-emitter junction of transistor 56, thereby turning on transistor 56, and also allowing current to flow from motor 16 through resistor 51a, resistor 51b, through transistor 56, and back to motor 16. Motor 16 thereby functions as a generator providing power which is absorbed primarily by resistors 51a and 51b and therefore functions as a braking device when controller 10 is not providing drive power to the motor 16.

Diode 42, in conjunction with resistors 51a and 51c, functions to provide a load for motor 16 if motor 16 begins turning in the reverse direction due to welding carriage 11 rolling in a reverse direction. This also serves to limit the reverse voltage applied across the base-emitter junction of transistor 56.

Diodes 42 and 54, and resistors 53 and 55 form the sensing section 38, and transistor 56 and resistors 51a, 51b and 51c form the braking section 39. Sensing section 38 determines whether motor 16 is driving carriage 11 or is being driven by carriage 11. Braking section 39, in response to a signal from sensing section 38, places a load across motor 16 so that it functions as a loaded generator and provides a braking action for carriage 11.

Although three resistors 51a, 51b and 51c are shown, only one resistor is necessary. If resistor 51a is eliminated then, when controller 10 is providing drive power, motor 16 will receive the full drive voltage (less the voltage drop across the parallel combination of diode 52 and resistor 43) provided by controller 10. Therefore, more of the power provided by controller 10 will go to motor 16. However, in such a case, it may be necessary to increase the value of resistor 51c so as to limit the current through diode 42 if motor 16 begins turning in a reverse direction. If resistor 51a is left in the circuit then resistors 51b and 51c may be eliminated unless necessary to limit the current through diode 42 and/or transistor 56.

Some controllers 10 monitor the voltage generated by motor 16 during the period when controller 10 is not providing drive power to motor 16. Since diode 52 is reverse biased when motor 16 is functioning as a generator controller 10 will not be able to monitor this voltage. Resistor 53 shunts diode 52 to a limited degree so that controller 10 may monitor the voltage generated by motor 16, even when diode 52 is reverse biased.

If diode 54 is eliminated (replaced by an open circuit) then resistor 55 will also turn transistor 56 on when controller 10 is providing drive power. The circuit of FIG. 3B will then perform exactly as the circuit of FIG. 3A since resistor 51b, like resistor 41b, will draw power from controller 10.

If diode 54 is eliminated (replaced by a short circuit) then resistor 53 and diode pair 65 should be eliminated (replaced by an open circuit) or the values of resistor 53 and/or 55 selected to assure that transistor 56 is turned on when motor 16 is acting as a generator.

A 47 ohm resistor 62 and a 0.1 microfarad capacitor 63 are connected in parallel with the base-emitter junction of transistor 56. Resistor 62 provides a pull down for the base of transistor 56 and, in conjunction with resistor 55, forms a voltage divider which affects the point at which transistor 56 turns on. Capacitor 63 provides smoothing so as to eliminate noise transients. A 100 ohm potentiometer 60, connected as a rheostat, is connected between the base of transistor 56 and negative conductor 14b. This potentiometer controls the regulation. A higher resistance value causes a net increase in the motor speed under a load. A first pair 61 of 15 volt, 1 watt zener diodes, placed back to back, are connected in parallel with diode 54 and potentiometer 60. In the preferred embodiment, diode 54 is a type 1N5817 schottky diode, rated at 1 amp and 20 volts. Diode pair 61 has a lower breakdown voltage than the reverse voltage of diode 54 and prevents diode 54 from experiencing reverse voltage breakdown from noise spikes which may appear on conductors 14a and 14b. Although only diode 61a is believed to be necessary to protect diode 54, the second diode 61b is provided as an additional precaution against noise spikes. Similarly, a second zener diode pair 65 is placed in parallel with diode 52 which, in the preferred embodiment, is a type 1N5825 schottky diode rated at 5 amps and 40 volts. Although these precautions may not be necessary, it will be appreciated that when motor 16 is turning very slowly or is stalled, it appears as a large inductor and can generate large voltage spikes if the current flow is interrupted for any reason.

Resistor 62, in addition to serving as a pull down resistor for transistor 56, also serves to bleed off any collector-base leakage current flowing from transistor 56. In operation, some circuits tended to produce erratic results if a first transistor was used and produced the desired results if a second transistor, of the same type, was substituted. The exact mechanism causing the erratic operation is not known but it is believed that the collector-base leakage current, the current amplification factor, and the precise base-emitter turn-on voltage of each individual transistor determined how that particular transistor responded to the noise spikes present in the system.

It is also possible to eliminate (replace by an open circuit) diode 52 and use only resistor 53. If this is done, then the voltage drop across resistor 53 will be dependent upon the current flow through motor 16. The heat generated by resistor 53 will therefore be proportional to the square of the motor current. Diode 52 simply functions as a non-linear resistor so that increasing motor currents do not cause a corresponding increase in the voltage drop. As is well known to those skilled in the art, within a reasonable range of currents, the voltage drop across a schottky diode remains relatively independent of the current through the diode. The result is that the heat generated by the diode 52 and resistor 53 combination is dependent upon the product of the motor current and the relatively constant drop across the diode 52. This reduces the heat generated in the system and improves the overall system efficiency. It should be noted that a large voltage drop across diode 52 and resistor 53 is not required. It is sufficient for the present invention that the voltage drop across this combination, or either component if used singly, be sufficient to cause transistor 56 to turn on when motor 16 is functioning as a generator.

In general, better speed regulation will be achieved if a higher pulse repetition rate is used with controller 10. With one controller and motor combination a pulse repetition frequency of 900 to 1200 Hertz produces the best performance.

FIG. 3C is another embodiment of the present invention and operates in the same manner as FIG. 3B except that, in FIG. 3C, a PNP transistor 56' is used instead of the NPN transistor 56 of FIG. 3B. Components 42', 51a', 52'–55', 60'–63', and 65' perform the same functions as their unprimed components in FIG. 3B. However, their position and/or orientation is changed to accommodate the fact that transistor 56' is a PNP transistor. Although the transistors specified for FIG. 3B are all silicon transistors, it will be appreciated that the present invention is not limited to operation with silicon transistors. For example, the PNP transistor 56' of FIG. 3C may be a germanium transistor, such as the 2N5325. Germanium transistors are advantageous in that the base-emitter voltage required for turn-on is less (0.3 v) than that required by silicon transistor (0.7 v). Also, the collector-emitter saturation voltage (0.1 v) is less. These lesser voltages become important in cases where motor 16 is turning slowly and the back EMF is very low.

FIG. 3D is a schematic diagram of another embodiment of the present invention. The principle of operation is the same as that for FIG. 3B, that is, when drive power is being applied by controller 10 transistor 56 is turned off and when drive power is not being applied and motor 16 is functioning as a generator transistor 56 is turned on. Positive conductor 14a is connected to one end of resistors 51a, 51b, 51c and 57, and to the collector of transistor 67. The other end of resistor 51c is connected to the cathode of diode 42. Negative conductor 14b is connected to the cathode of diodes 52 and 54 and to one end of resistor 53. The anode of diode 54 is connected to the base of a PNP transistor 66, such as the A92, the base of an NPN transistor 67, such as the A42, and the other end of 1000 ohm resistor 57. The emitters of transistors 66 and 67 are connected together and to the base of an NPN transistor 56. The collector of transistor 56 is connected to the other end of resistor 51b. The emitter of transistor 56 is connected to the collector of transistor 66, the anodes of diodes 42 and 52, the other end of resistor 53, and two of the terminals of a double pole, double throw reversing switch 64. The other end of resistor 51a is connected to two other terminals of switch 64. Motor 16 is connected to the poles of switch 64. Switch 64 is used in a well known fashion to reverse the polarity of the voltage being provided to motor 16 so that the direction of rotation of motor 16 may be selected to be in a forward direction or a reverse direction.

The operation of diodes 42, 52 and 54 and the operation of resistors 51a, 51b, and 53 are the same as in FIG. 3B. That is, diodes 52 and 54, in conjunction with new transistor 66, serve to turn off transistor 56 when controller 10 is applying drive power to motor 16. The operation of resistor 57 is essentially the same as the operation of resistor 55. When controller 10 is not applying drive power and motor 16 is functioning as a generator, resistor 57, in conjunction with new transistor 67, turns on transistor 56 which, in turn, allows resistors 51a and 51b to serve as a load for motor 16. The addition of transistors 66 and 67 provide for better turn off and turn on signals, respectively, for transistor 56. More specifically, transistor 67 provides increased base drive for transistor 56, thereby serving to assure that transistor 56 operates in a saturated state. Also, the use of transistor 67 allows the use of a higher resistance, lower power rating resistor for resistor 57 as compared against the resistor used for resistor 53 of FIG. 3B. When transistor 67 turns off then transistor 66, in conjunction with diode 54, serves to more rapidly deplete any stored charge remaining in the base of transistor 56 and thereby accelerate the turning off of transistor 56. Transistor 66 may be eliminated (replaced by open circuits) but in this case a resistor (not shown) should be connected between the base and emitter of transistor 56 so as to help deplete the stored charge and shunt any leakage currents.

Diode 42, in conjunction with resistors 51a and 51c, again provides a load for motor 16 in the event that the welding carriage 11 begins moving in a reverse direction. Also, resistor 53 provides a signal path so that controller 10 may, if necessary, monitor the EMF generated by motor 16 during the period when controller 10 is not providing drive power to motor 16. Switch 64 allows the polarity of the drive power applied to motor 16 to be reversed so that welding carriage 11 may be selectably driven in a clockwise or counterclockwise direction around the circumference of workpiece 12.

Figure 3E:
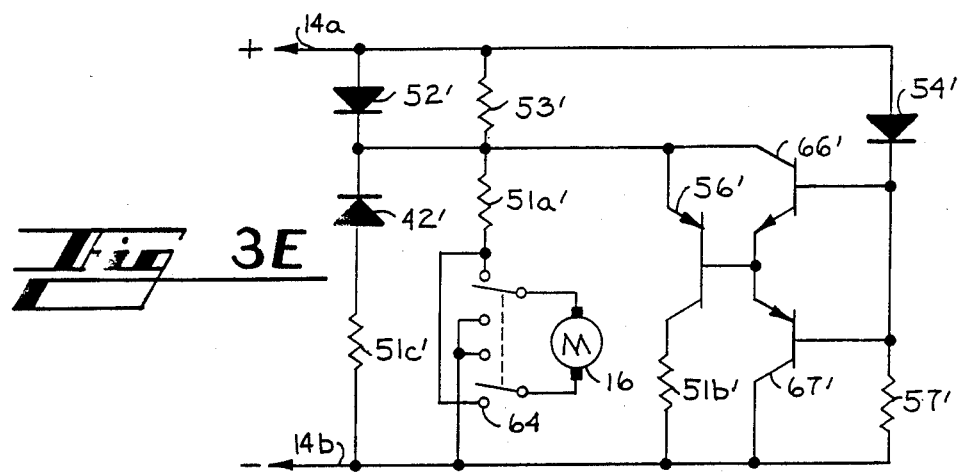
Figure 3F:
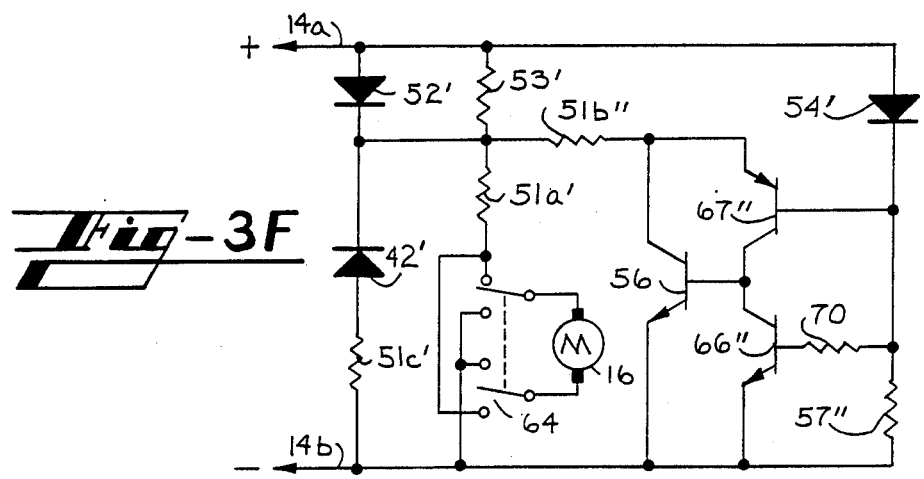

Although they are not shown, it will be appreciated that the voltage limiting devices 61 and 65, the noise filtering capacitor 63, the regulating potentiometer 60, and the base loading resistor 62 of FIG. 3B are also applicable to the circuit of FIG. 3D, FIG. 3E, and FIG. 3F. The embodiments of FIGS. 3C-3F may also be conveniently considered to have a sensing section 38 and a braking section 39.

Options regarding the elimination of one or two of resistors 51a, 51b, and 51c are subject to the same considerations as described in conjunction with the circuit of FIG. 3B.

FIG. 3E is a schematic diagram of another embodiment of the present invention. It will be noted that FIG. 3E is similar to FIG. 3C but with the exception that resistor 51b' is selectably connected into or out of the circuit by PNP transistor 56' and transistor 56' is driven by PNP transistor 67' and NPN transistor 66'. Transistors 67' and 66' serve to turn on and turn off, respectively, transistor 56' in a manner similar to that described in conjunction with the operation of the circuit in FIG. 3D. More particularly, diodes 52' and 54', in conjunction with transistor 66', serve to rapidly turn off transistor 56' and maintain transistor 56' in an off state when controller 10 is applying drive power. When controller 10 is not applying drive power and motor 16 is functioning as a generator then resistor 57' and transistor 67' serve to fully turn on transistor 56' which, in turn, connects resistors 51a' and 51b' into the circuit to act as a load for motor 16. Likewise, diode 42', in conjunction with resistors 51a' and 51c', is active when motor 16 is turning in a direction reverse to that which is desired. Also, switch 64 again allows reversing the polarity of the drive power provided to motor 16 so that welding carriage 11 may selectably operate in a clockwise or counterclockwise rotation around the circumference of workpiece 12.

FIG. 3F is an illustration of another embodiment of the present invention. This circuit is designed to use an NPN transistor 56 in a circuit which is otherwise similar to that of the circuit in FIG. 3E. Positive conductor 14a is connected to the anodes of diodes 52' and 54' and one end of resistor 53'. The other end of resistor 53' is connected to the cathodes of diodes 42' and 52', one end of resistor 51a', and one end of resistor 51b''. The anode of diode 42' is connected to one end of resistor 51c'. The other end of resistor 51a' is connected to two terminals of a double pole, double throw reversing switch 64. A motor 16 is connected to the poles of the switch 64. Negative conductor 14b is connected to the other end of resistor 51c', two other terminals of switch 64, the emitters of NPN transistors 56 and 66'', and one end of resistor 57''. The other end of resistor 57'' is connected to the cathode of diode 54', the base of PNP transistor 67'', and, through resistor 70, to the base of transistor 66''. The collectors of transistors 66'' and 67'' are connected to the base of transistor 56. The collector of transistor 56 and the emitter of transistor 67'' are connected to the other end of resistor 51b''. When controller 10 is applying drive pulses then transistor 66'' will be turned on via diode 54' and resistor 70. Resistor 70 is required in order to limit the base current through transistor 66''. Transistor 67'' is turned off because of the action of diodes 52' and 54'. Therefore, transistor 66'' holds the base of transistor 56 at a low level, thereby assuring that transistor 56 is turned off and that any stored charge is rapidly depleted. Between pulses from controller 10, when motor 16 is functioning as a generator, then transistor 67'' will be turned on by resistor 57''. Transistor 66'' will also tend to be turned on, to a degree, by the current flowing through transistor 67'' and the voltage developed across resistor 57''. However, the current limiting effect of resistor 70 allows transistor 67'' to source more current than transistor 66'' can sink. The result is that transistor 56 is turned on and resistors 51a' and 51b'' operate as loads for motor 16. Furthermore, once transistor 56 is turned on then the voltage at the emitter of transistor 67'' will tend to drop, which decreases the base current through transistor 67''. However, the base drive of transistor 66'' is accordingly reduced, so that transistor 67'' still sources more current than transistor 66'' sinks. Also, the low value of resistor 57'' tends to prevent the base current of transistor 67'' from causing a voltage across resistor 57'' which is sufficiently large to turn on transistor 66''. The circuit of FIG. 3F allows an NPN transistor to be used for transistor 56 while still allowing the emitter of transistor 46 to be connected to the negative conductor 14b. In comparison, the emitter of transistor 56 in FIGS. 3B and 3D is not connected to negative conductor 14b.

Inasmuch as the circuit of FIG. 3E has been modified to form the circuits shown in FIG. 3F so as to allow the use of an NPN transistor 56, it will be appreciated that the circuit of FIG. 3D may be correspondingly modified so as to use a PNP transistor for transistor 56.

Figure 4:
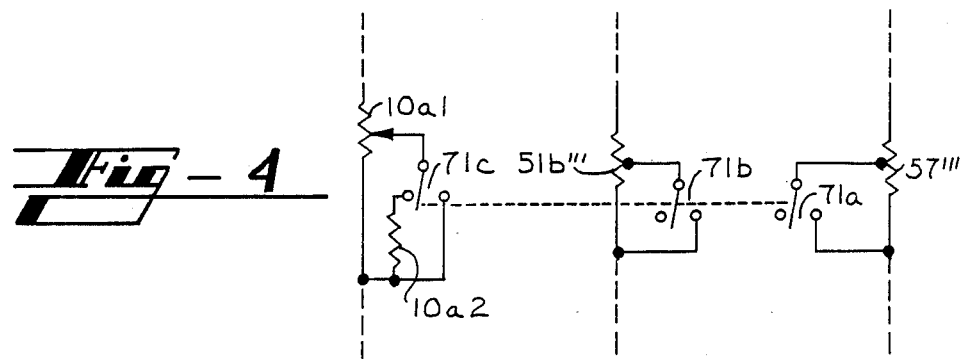
FIG. 4 is an illustration of a modification which reduces power consumption.

FIG. 4 is an illustration of a modification which reduces power consumption. On occasion, it may be desirable to run welding carriage 11 at a speed close to its maximum operating speed. In such a case, it may be found that the braking action provided by the present invention may be such that the desired speed cannot be attained. Therefore, in FIG. 4, resistor 51b''', which is representative of resistors 51b, 51b', and 51b'', is center-tapped. The center tap and one end of resistor 51b''' are connected to a set of normally open contacts 71b of a three pole, double throw switch. Resistor 51b'''', in this circuit, preferably has a value of approximately twice its original value. Therefore, when low speed and full braking operation is desired switch 71b is operated so as to close the contacts, thereby shorting out one half of resistor 51b'''', and presenting a low impedance load to the motor 16. This causes motor 16 to exert a substantial braking action. However, when higher speed operation is desired, switch 71b is placed as shown so that motor 16 sees the full value of resistor 51b'''' and provides less braking action.

Likewise, resistor 57'''', which is representative of resistor 57, 57', and 57'', is centertapped and has a value of approximately twice its original value. When low speed operation is desired switch 71a shorts out one half of resistor 57''''. Resistor 57'''' therefore draws more current but, at low speed operation, the extra current drawn from the controller 10 is generally negligible. However, when higher speed operation is desired, and controller 10 is providing more of a steady stream of large duty cycle pulses then the power drawn by resistor 57'''' will tend to be noticeable. Therefore, at high speed operation, switch 71a opens so that the full resistance of resistor 57'''' is used, thereby reducing the current and power drain on controller 10.

In some cases, controller 10 may be mounted on, and be a part of, welding carriage 11. In such a case then switch section 71c would be a part of the switch 71 comprising switch sections 71a and 71b. Otherwise, switch section 71c would preferably be independent of switch sections 71a and 71b. As previously indicated, controller 10 has a potentiometer for adjusting the speed. This potentiometer is shown as potentiometer 10a1. Normally, as for low speed operation, switch section 71c would be operated so as to short out the lower portion of potentiometer 10a1 of controller 10. However, when higher speed operation is desired, switch 71c would preferably be placed in the position shown so that the shunting action of the wiper of potentiometer 10a1 would be reduced by the resistance of resistor 10a2. This allows for a more precise speed adjustment on the higher speed settings. Of course, other resistors may be made variable and/or ganged so as to allow adjustment of the degree of regulation achieved, the amount of braking provided, the maximum amount of current that may be absorbed, the brake/release threshold, etc.

Figure 5:
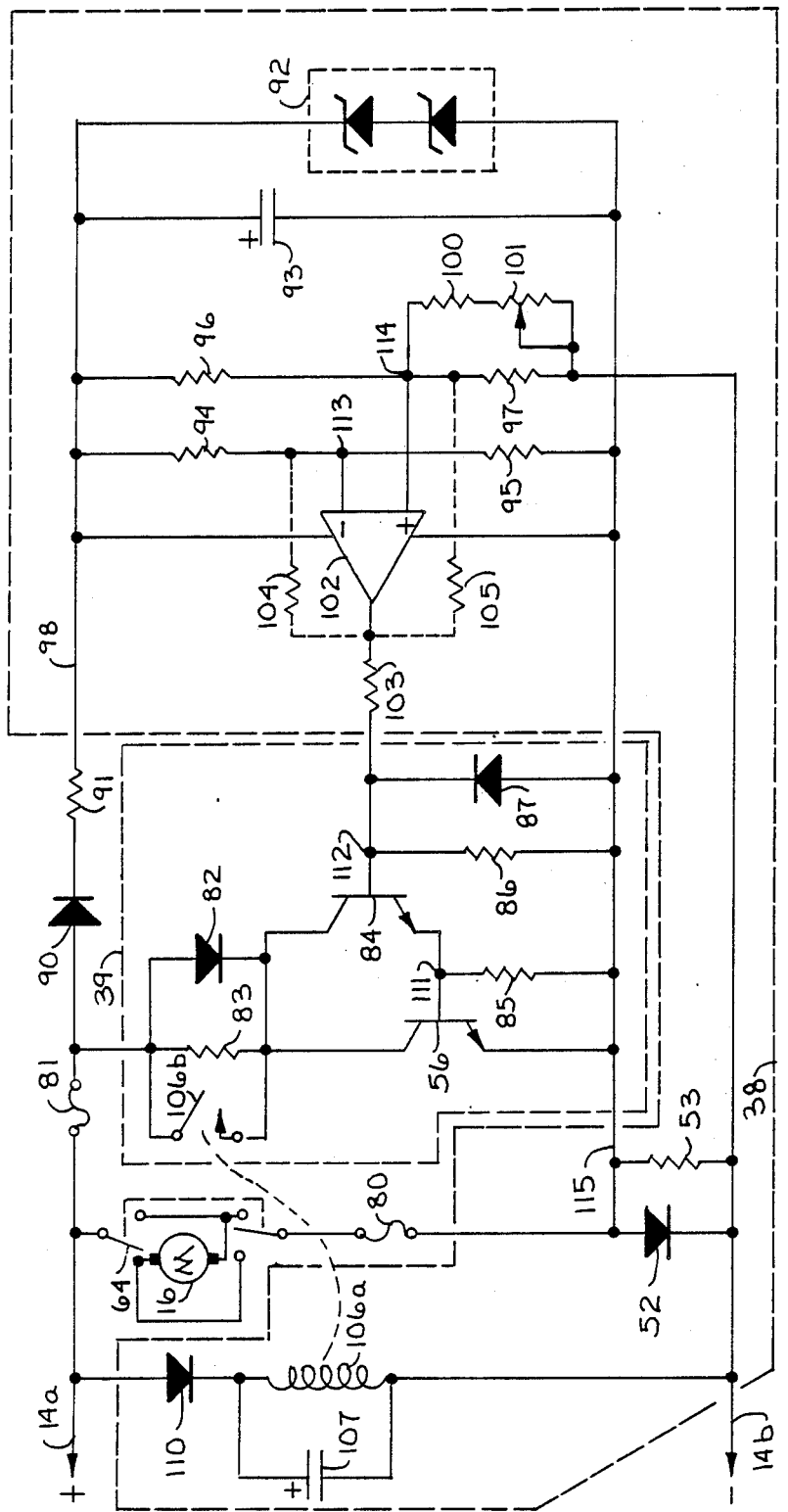
FIG. 5 is a schematic diagram of another embodiment of the present invention.

Turn now to FIG. 5 which is an illustration of another embodiment of the present invention. FIG. 5 is advantageous in that the power required to turn on transistor 56 for braking purposes is derived from the controller 10 when a pulse 30-32 is present. Therefore, the circuit is useful at low motor speeds which would be insufficient, by themselves, to cause motor 16 to provide a sufficient voltage to turn on transistor 56. The circuit of FIG. 5 is slightly disadvantageous in that additional components are required and a slightly higher cost results therefrom.

Positive conductor 14a is connected to the anode of diode 110, one pole of a double pole, double throw reversing switch 64, and one end of a ¾ amp fuse 81. The cathode of diode 110 is connected to one end of relay coil 106a and the positive terminal of a 5 microfarad capacitor 107. The other end of capacitor 107 and relay coil 106a are connected to negative conductor 14b. One terminal of motor 16 is connected to two of the terminals of switch 64. The other terminal of motor 16 is connected to the other two terminals of switch 64. The other pole of switch 64 is connected through a 1.5 amp fuse 80 to bus 115, the anode of schottky diode 52 and end of a 0.2 ohm resistor 53. The cathode of diode 52 and the other end of resistor 53 are connected to negative conductor 14b. The other end of fuse 81 is connected to the anode of diodes 82 and 90, one end of a 100 ohm resistor 83, and one contact of a normally open set of contacts 106b of relay 106. The cathode of diode 82, the other end of resistor 83, and the other contact of relay contacts 106b are connected to the collectors of transistors 56 and 84, which are connected in a Darlington configuration. The emitter of transistor 84, the base of transistor 56, and one end of a 1000 ohm resistor 85 are connected to node 111. The base of transistor 84, one end of a 1000 ohm resistor 86, and the cathode of diode 87 are connected to node 112. The anode of diode 87, the emitter of transistor 56, and the other end of resistors 85 and 86 are connected to conductor 115. Transistors 56 and 84, along with their associated components, described above, form the braking section 39. In the preferred version of this embodiment, either relay 106 is used or the parallel combination of diode 82 and resistor 83 is used. The non-selected component(s) are then replaced by an open circuit. However, this embodiment can also be used with all three components present and functional.

Consider first the operation of the components previously listed. When motor 16 is functioning as a motor, transistors 56 and 84 will be turned off and will not draw any current. However, when motor 16 begins functioning as a generator transistors 56 and 84 will be turned on so that motor 16 provides a braking load for carriage 11. Relay 106, when energized, causes diode 82 and resistor 83 to be bypassed so that transistor 56 may present a direct short across the output of motor (generator) 16. This provides for the most effective braking action. Relay 106 can be eliminated but, in that case, the parallel combination of resistor 83 and diode 82, which are in series with transistors 56 and 84, will somewhat reduce the degree of braking available.

Resistor 83 also provides a current limiting protection feature. If controller 10 placed a reverse voltage on conductors 14a and 14b then the current flow through the forward biased junction of transistor 84 and diode 87, limited only by the very small resistance of resistor 53, could damage controller 10, transistor 84, diode 87, and/or resistor 53. Therefore, resistor 83 limits the current so that, in the event controller 11 reverses the polarity of the voltage on conductors 14a and 14b, destruction of the components listed above will not occur. Resistor 83 also protects diode 82 from excessive reverse voltages. In the preferred version of this embodiment, diode 82 is a schottky diode and has a reverse breakdown voltage of 40 volts. However, some controllers 11 can produce output voltages in excess of 40 volts. If the controller 11 were to produce a reverse voltage of, for example, 48 volts, the reverse voltage rating of diode 82 could be exceeded and diode 82 could be destroyed. However, resistor 83, in conjunction with transistors 56 and 84, resistors 85 and 86, and diode 87, forms a voltage divider network which limits the reverse voltage which may be developed across diode 82. Of course, the presence of resistor 83 does reduce the effectiveness of the braking action that is available when motor 16 is turning in the reverse direction and functioning as a generator. If relay 106 is not used then diode 82 bypasses resistor 83 so that effective braking action can be obtained when motor 16 is functioning as a generator and turning in the forward direction. Diode 82 also bypasses resistor 83 in the event that the voltage generated by controller 10 and/or motor 16 and stored by capacitor 107 is insufficient to hold relay 106 in the energized position.

Resistor 83 also provides some braking when motor 16 begins turning in a reverse direction, but still acting as a generator. When motor 16 is acting as a generator, but turning in the reverse direction, conductor 14a will be negative with respect to conductor 115. This will forward bias diode 87 and the base-collector junction of transistor 84.

The anode of diode 90 is connected through a 100 ohm, 2 watt resistor 91 to positive bus 98. Positive bus 98 is connected to one end of a 10k ohm resistor 94, one end of an 11k ohm resistor 96, the positive terminal of a 22-100 microfarad capacitor 93, and the cathode of a 30 volt, 10 watt zener diode 92. Zener diode 92 comprises two 15 volt, 5 watt zener diodes connected in series. The anode of zener diode 92, the other end of capacitor 93, and one end of a 10k ohm resistor 95 are connected to conductor 115, which functions as the negative bus for this part of the circuit. The other end of resistor 94, the other end of resistor 95, and the inverting input of comparator 102 are connected to node 113. The voltage at node 113 serves as the reference voltage for comparator 102. The other end of resistor 96, one end of a 11k ohm resistor 97, one end of a 250k resistor 100, and the non-inverting input of comparator 102 are connected to node 114. The voltage at node 114 serves as the signal input voltage to comparator 102. The other end of resistor 100 is connected to one of a 278k potentiometer 101, which is connected as a rheostat. The other end of potentiometer 101 and the other end of resistor 97 are connected to negative conductor 14b. Comparator 102 receives its operating voltage via conductors 98 and 115. Resistor 53, comparator 102, and its associated components, form the sensing section 38.

Consider now the operation of this part of the circuit. When controller 10 is applying a positive voltage to conductor 14a and motor 16 is functioning as a motor, then there will be a voltage drop across diode 52 and/or resistor 53. This means that node 113 will be at a higher potential than node 114 and the output of comparator 102 will be a voltage at or near the potential of conductor 115. Therefore, transistors 56 and 84 will be turned off and will not absorb drive power from controller 10. However, assume now that controller 10 is not supplying a voltage and that motor 16, still turning in the forward direction, is now functioning as a generator. Conductor 114 will rise above the level of conductor 113, thereby causing comparator 102 to turn on transistors 56 and 84 which, in turn, cause motor 16 to provide a braking action. The advantage to this type of circuit is that comparator 102, because of its very high gain, provides a sharp turn on/turn off transition for transistors 56 and 84. In addition, capacitor 93 provides a storage charge sufficient to power comparator 102 and turn on transistors 56 and 84, even when motor 16 is turning at such a slow speed that the generated voltage would be insufficient, by itself, to turn on transistor 56 if transistor 56 were connected as shown in the circuits of FIGS. 2 and 3.

Potentiometer 101 is preferably adjusted so that, when motor 16 is generating no voltage, comparator 102 is turned on and so that, when motor 16 is drawing a current (functioning as a motor) comparator 102 is turned off.

An optional resistor 105, connected between the output of comparator 102 and node 114, can be used to provide a desired level of hysteresis. This hysteresis action is useful in preventing a jerky or erratic braking action when motor 16 is turning very slowly or where welding carriage 11 is on a very slight incline.

An optional resistor 104, connected between the output of comparator 102 and node 113, controls the voltage gain of comparator 102. This feature is useful in cases where it may be desirable to apply the braking action more gradually as opposed to a brake on or brake off control. Of course, optional resistors 104 and 105 can be used together to provide both hysteresis and a control voltage gain.

Also, a capacitor may be connected between node 114 and conductor 115 to reduce the effects of noise transients, such as from brush sparking, and/or to introduce a slight delay in the operation of comparator 102.

Assume now that relay 106 is used and diode 82 and resistor 83 are replaced by an open circuit. Relay 106 then selectably connects and disconnects transistors 56 and 84 from motor 16. Relay 106 will be energized and connect transistors 56 and 84 to motor 16 whenever controller 10 causes conductor 14a to be sufficiently positive with respect to conductor 14b, and between pulses 30, 31, 32 for as long as capacitor 107 has a sufficient stored charge. In this case, transistors 56 and 84 can provide a load for motor 16 so that motor 16 can provide a braking action between pulses. However, if controller 10 reverses the polarity of the voltage on conductors 14a and 14b then relay 106 will be deenergized, thereby disconnecting transistors 56 and 84 from motor 16. In this case no braking action will be provided. However, this can be advantageous in situations where the welder may want the welding carriage 11 to move backwards, such as for restarting a welding operation. In such a procedure, it is frequently desirable that the welding carriage 11 move in the reverse direction at a high speed, that is, without braking. Therefore, relay 106 disables the braking section 39. Of course, reversal could be obtained by simply switching switch 64 but, in such a case, the carriage would move more slowly since braking would still be provided.

Figure 6:
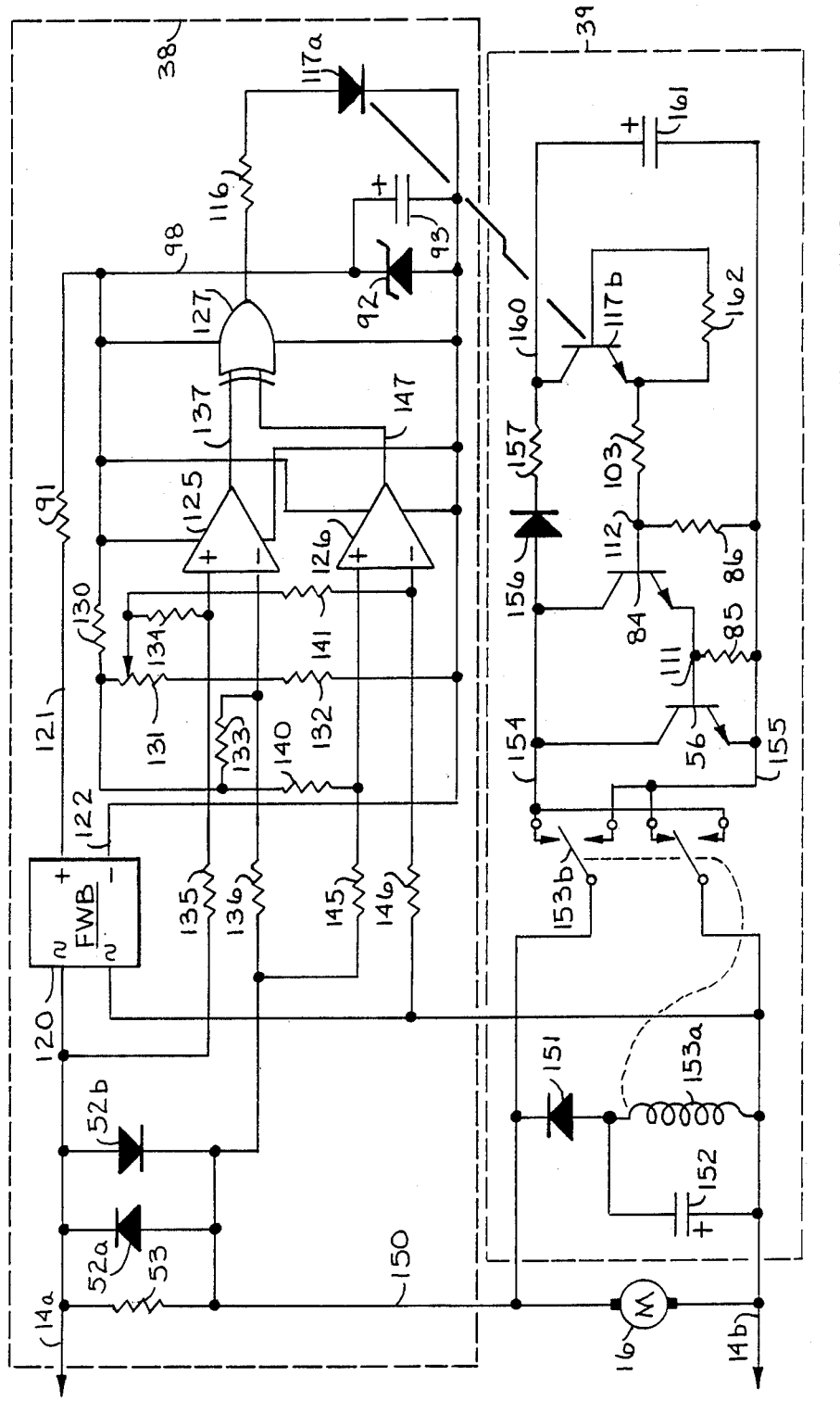
FIG. 6 is a schematic diagram of an embodiment of the present invention which allows the use of a reversible polarity input voltage.

Turn now to FIG. 6 which is another embodiment of the present invention. This embodiment is useful with controllers 10 which may produce an output voltage of either polarity and is also useful to eliminate the need for the welder to throw a reversing switch 64 (FIG. 5). Conductor 14a is connected to one end of a resistor 53, the cathode of diode 52a, and the anode of diode 52b. The other end of resistor 53, the anode of diode 52a and the cathode of diode 52b are connected by conductor 150 to one terminal of motor 16, the cathode of diode 151, and one pole of a set of double pole, double throw contacts 153b of a relay 153. Conductor 14b is connected to the other terminal of motor 16, the other pole of relay contacts 153b, one end of the coil 153a of relay 153, and the positive terminal of capacitor 152. The other end of capacitor 152 and the other end of coil 153a are connected to the anode of diode 151.

The normally closed contact of the first section and the normally open contact of the second section of relay contacts 153b are connected by conductor 154 to the collector of transistors 56 and 84 and the anode of diode 156. The normally open contact of the first section and the normally closed contact of the second section of relay contacts 153b are connected by conductor 155 to the emitter of transistor 56, one end of resistor 85 and one end of resistor 86, and the negative terminal of capacitor 161. Transistors 56 and 84 are connected in a Darlington configuration with resistors 85 and 86 providing pull down. The base of transistor 56 is connected to the other end of resistor 85 and to the emitter of transistor 84. The base of transistor 84, the other end of resistor 86, and one end of resistor 103 are connected at node 112. The other end of resistor 103 is connected to the emitter of transistor 117b of an opto-isolator 117 and to one end of a pull down resistor 162. The base of transistor 117b is connected to the other end of resistor 162. The cathode of diode 156 is connected through a current limiting resistor 157 to conductor 160, to the collector of transistor 117b, and to the positive terminal of capacitor 161. Diode 156 prevents transistors 56 and 84, when turned on, from discharging capacitor 161. Relay 153, transistors 56 and 84, opto-isolator 117, and their associated components, together form the braking section 39.

If conductor 14a is positive with respect to conductor 14b then relay 153 will not be energized. If motor 16 is functioning as a motor, then opto-isolator 117 and transistors 56 and 84 will be turned off. However, when motor 16 is functioning as a generator opto-isolator 117 and transistors 56 and 84 are turned on and present a short circuit to motor (generator) 16, which provides an effective braking action. If conductor 14b is positive with respect to conductor 14a then diode 151 will be forward biased and relay 153 will be energized. This reverses the connection to conductors 154 and 155 so that transistors 56 and 84 and opto-isolator 117 still receive the proper polarity voltage. Again, when motor 16 is functioning as a motor then opto-isolator 117 and transistors 56 and 84 are turned off and do not draw current. However, when motor 16 is functioning as a generator then opto-isolator 117 and transistors 56 and 84 are turned on and present a short circuit to motor (generator) 16.

Capacitor 152 should be large enough to hold a sufficient charge to keep relay 153 energized between pulses so that relay chatter and jerky braking operation does not occur. The event may occur wherein motor 16 is operating as a generator, is rotating in a reverse direction so that conductor 150 is negative with respect to conductor 14b, and is rotating at such a slow rate that, between pulses, relay 153 drops out. In this case, transistors 56 and/or 84 will operate in the inverted mode and will still provide some braking action. A fullwave bridge, such as bridge 120, may be used instead of relay 153 to provide the proper polarity voltage to transistors 56 and 84. However, the bridge will introduce two additional diode drops which can reduce the degree of braking action provided by motor 16, especially at low speeds.

Conductor 14a and conductor 14b are connected to the AC inputs of a fullwave bridge (FWB) rectifier 120. The positive output of bridge 120 is connected through a current limiting resistor 91 to positive bus 98. The negative output of bridge 120 is connected to negative bus 122. A zener diode 92 and an electrolytic capacitor 93 are connected in parallel between positive bus 98 and negative bus 122 to provide voltage regulation and filtering. Positive bus 98 and negative bus 122 are also connected to the positive and negative power input terminals, respectively, of comparators 125 and 126 and exclusive-OR (XOR) gate 127. Resistor 130, potentiometer 131, and resistor 132 are connected between positive bus 98 and negative bus 122 and form a voltage divider. The junction of resistor 130 and potentiometer 131 is connected to one end of resistor 133 and one end of resistor 140. The wiper of potentiometer 131 is connected to one end of resistor 134 and one end of resistor 141. One end of resistor 135 is connected to conductor 14a. The other end of resistor 135 and the other end of resistor 134 are connected to the non-inverting input of comparator 125. One end of resistor 136 is connected to conductor 150. The other end of resistor 133 and the other end of resistor 136 are connected to the inverting input of comparator 125. It will be noted that comparator 125 responds to the voltage developed across the parallel combination of resistor 53 and diodes 52a and 52b. If current is flowing from conductor 14a through resistor 53 to conductor 150 then the output of comparator 125 will be a logic 1. However, if current is flowing in the opposite direction then the output of comparator 125 will be a logic 0. Comparator 125 therefore senses the direction of current flow into motor 16. When the output of comparator 125 is connected by conductor 137 to one of the inputs of XOR gate 127.

One end of resistor 145 is connected to conductor 150. The other end of resistor 145 and the other end of resistor 140 are connected to the non-inverting input of comparator 126. One end of resistor 146 is connected to conductor 14b. The other end of resistor 146 and the other end of resistor 141 are connected to the inverting input of comparator 126. Comparator 126 is therefore responsive to the voltage across motor 16. If conductor 150 is positive with respect to conductor 14b then the output of comparator 126 will be a logic 1. If conductor 150 is negative with respect to conductor 14b then the output of comparator 126 will be a logic 0. The output of comparator 126 is connected by conductor 147 to the other input of XOR gate 127. The output of gate 127 is connected through a current limiting resistor 116 and diode 117a of an opto-isolator to negative conductor 122. Resistor 53, comparators 125 and 126, gate 127 and opto-isolator 117 form the sensing section 38. Potentiometer 131 is adjusted so that one input of comparators 125 and 126 is at a slightly lower voltage than the other input of these comparators when there is a zero voltage difference between conductors 14a and 14b. This causes the sensing section 38 to be slightly predisposed to provide a braking action if a sufficient control signal (14a, 14b) is not present. If desired, hysteresis can also be added to one or both of these comparators by adding a positive feedback resistor such as resistor 105 of FIG. 5.

Assume first that conductor 14a is positive with respect to conductor 14b and that motor 16 is operating as a motor. The output of comparators 125 and 126 will be logic 1's, the output of gate 127 will be a logic 0, opto-isolator 117 will be turned off, and transistors 56 and 84 will be turned off. Therefore, no braking action will be provided. However, now assume that motor 16 is functioning as a generator. The output of comparator 125 will now be a logic 0, because the current flow through resistor 53 has reversed direction, and the output of comparator 126 will still be a logic 1. The output of gate 127 will be a logic 1, opto-isolator 117 will be turned on, and transistors 56 and 84 will be turned on so as to provide braking action for motor 16.

Assume now that conductor 14a is negative with respect to conductor 14b and that motor 16 is functioning as a motor. The output of comparators 125 and 126 will be a logic 0, the output of gate 127 will be a logic 0, opto-isolator 117 will be turned off, and transistors 56 and 84 will be turned off. Therefore, no braking action is being provided. Assume now that motor 16 is functioning as a generator. The current flow through resistor 53 will be reversed and the output of comparator 125 will be a logic 1. However, the output of comparator 126 will still be a logic 0. The output of gate 127 will be a logic 1, opto-isolator 117 will be turned on, transistors 56 and 84 will be turned on, and the braking action will be provided. Therefore, by sensing the direction of the current through the motor and the polarity of the voltage across the motor sensing section 38 can determine whether motor 16 is functioning as a motor or as a generator and deactivate or activate, respectively, the braking section 39.

Diodes 52a and 52b are preferably schottky diodes so as to limit the voltage drop across resistor 53. It is only necessary that the voltage drop across resistor 53 be sufficient to operate comparator 125 and, to avoid unnecessary wasting of power provided to motor 16, it is preferred that the value of resistor 53 be as small as possible. Since the purpose of resistor 53 is to allow comparator 125 to determine the direction of current flow through motor 16 it will be appreciate that a Hall effect device could be used instead of resistor 53 to provide information on the polarity of the current to comparator 125.

It will also be appreciated that an opto-isolator diode, or a pair of opto-isolator diodes connected in alternate orientation, may be used in series with motor 16 to provide an indication of the direction of current flow through motor 16. Also, an opto-isolator diode or a pair of opto-isolator diodes, connected in alternate orientation, can be connected in parallel with motor 16 to provide an indication of the polarity of the voltage developed across motor 16. Again, precautions should be taken to limit the current through the opto-isolator diodes. The disadvantage of opto-isolator diodes is that the voltage required to cause the diodes to emit and turn on their associated transistor is noticeably larger than the voltage required to cause the comparators to change states.

Controller 10 should be set so that it slightly over-regulates the output voltage. That is, controller 10 is programmed to change the pulse width at a rate faster than that which is needed to strictly compensate for changes in the load. This means that as the load increases, such as when welding carriage 11 is going uphill, controller 10 will provide pulse widths which, if the present invention were not used, would cause welding carriage 11 to actually increase its speed as it progresses uphill and to actually decrease its speed as it goes downhill.

If controller 10 has a low output impedance it may be desirable or necessary to have a current-limiting resistance between controller 10 and transistor 56 (56') so that there is not an excessive current flow during the interval between the beginning of a pulse (30, 31, 32) and the time at which transistor 56 (56') is turned off. This resistance may be conveniently provided by, for example, resistor 51b, 51b', 51b'', 53, 53', and/or the resistance of conductors 14a and 14b.

Although the present invention is intended primarily for use with controllers which provide a pulsed output it will be appreciated that the invention is not so limited. The present invention will provide a braking action whenever the carriage 11 begins driving the motor 16 instead of motor 16 driving carriage 11. Therefore, if motor 10 provides a DC voltage, of varying level, then whenever the momentum of the carriage 11, the force of gravity, or some other force causes welding carriage 11 to move at a higher speed or in a different direction than that indicated by the control voltage then the present invention will provide a braking action for the welding carriage. Also, although the figures depict the use of bipolar transistors it will be appreciated that MOS transistors, such as, but not limited to, the IRF 250 and the IRF 9131, may also be used provided conventional precautionary measures are taken to prevent the allowable gate-source voltage from being exceeded.

Although some component values and types have been specified it will be appreciated that the actual values for these components and the particular transistors and diodes used will depend upon the voltage and current requirements of the particular controller 10/motor 16 combination that is in service.

From the above it will be appreciated that the present invention describes a method and an apparatus for using a drive motor, in conjunction with one or more transistors, diodes, and/or resistors, to serve as a speed control and braking mechanism for a mechanism, such as a welding carriage, which is driven by the motor. From the detailed description and numerous embodiments described above, other alternative embodiments will become apparent to those of ordinary skill in the art. Therefore, the present invention is to be limited only by the claims below.

What is claimed is:

1. For use with a controller and a device driven by an electric motor, said controller regulating the speed of said device by changing a drive signal provided between a first output terminal and a second output terminal of said controller, said electric motor having at least a first motor terminal and a second motor terminal for receiving said drive signal, an apparatus for improving the regulation of said speed by said controller, comprising:
   means connecting said first output terminal to said first motor terminal;
   a first diode connected between said second output terminal and said second motor terminal, said first diode being forward biased when said drive signal is sufficient to cause said motor to drive said device;
   a first load resistor having a first end and a second end, said first end being connected to said first motor terminal;
   switching means responsive to a control signal for connecting said second end of said first load resistor to said second motor terminal;
   a resistor connected between said first motor terminal and a node; and
   a second diode connected between said second output terminal and said node, said second diode being forward biased when said drive signal is sufficient;
   wherein said node provides said control signal for said switching means.

2. The apparatus of claim 1 wherein said switching means comprises a transistor.

3. The apparatus of claim 1 and further comprising:
   a second load resistor interposed between said first motor terminal and a second node, said second node being connected to said first output terminal and said first load resistor.

4. The apparatus of claim 1 and further comprising:
   a switch for reversing connections to said first motor terminal and said second motor terminal.

5. The apparatus of claim 1 and further comprising:
   a third diode connected between said first motor terminal and said second motor terminal, said third diode being forward biased and providing a load for said motor so that said motor provides a braking action when said motor is being turned in a reverse direction.

6. The apparatus of claim 5 and further comprising: a third load resistor connected in series with said third diode.

7. For use with a controller and a device driven by an electric motor, said controller regulating the speed of said device by changing a drive signal provided to said electric motor, said electric motor having at least a first motor terminal and a second motor terminal for receiving said drive signal, an apparatus for improving the regulation of said speed by said controller, comprising:
   first means responsive to said motor being driven by said device for providing a control signal;
   second means responsive to said control signal for connecting a load between said first motor terminal and said second motor terminal;
   means for providing a first signal responsive to a direction of current flow through said motor; and
   means for providing a second signal responsive to a polarity of voltage developed across said motor;
   whereby said first means is responsive to said first signal and said second signal for providing said control signal.

8. The apparatus of claim 7 wherein said means for providing said first signal comprises:
   a resistor connected in series with said motor; and
   a comparator having a first input and a second input connected to a first end of said resistor and a second end of said resistor, respectively, for providing said first signal.

9. The apparatus of claim 7 wherein said means for providing said second signal comprises:
 a comparator having a first input connected to said first motor terminal and a second input connected to said second motor terminal.

10. The apparatus of claim 7 wherein said first means for providing said control signal comprises an exclusive-OR gate.

11. The apparatus of claim 10 wherein said first means for providing said control signal further comprises an opto-isolator.

12. The apparatus of claim 7 wherein said second means comprises a transistor.

13. The apparatus of claim 12 wherein said second means further comprises a resistor connected in series with said transistor.

14. For use with a controller and a device driven by an electric motor, said controller regulating the speed of said device by changing a drive signal provided to said electric motor, said electric motor having at least a first motor terminal and a second motor terminal for receiving said drive signal, an apparatus for improving the regulation of said speed by said controller, comprising:
 first means responsive to said motor being driven by said device for providing a control signal;
 second means responsive to said control signal for connecting a load between said first motor terminal and said second motor terminal;
 wherein said first means comprises a first resistor connected in series with said motor to form a first series circuit, a junction of said first resistor and said motor forming a first node, and a second series circuit, connected in parallel with said first series circuit, comprising a diode, a second node, and a second resistor, said control signal being a voltage difference between said first node and said second node.

15. The apparatus of claim 14 wherein said second means comprises a transistor.

16. The apparatus of claim 15 wherein said second means further comprises a resistor connected in series with said transistor.

17. For use with a controller and a device driven by an electric motor, said controller regulating the speed of said device by changing a drive signal provided to said electric motor, said electric motor having at least a first motor terminal and a second motor terminal for receiving said drive signal, a method for improving the regulation of said speed by said controller, comprising the steps of:
 (a) providing a first signal responsive to a direction of current flow through said motor;
 (b) providing a second signal responsive to a polarity of voltage developed across said motor; and
 (c) responding to said first signal and said second signal by providing a control signal; and
 (d) responding to said control signal by connecting a load between said first motor terminal and said second motor terminal.

18. The method of claim 17 wherein step (a) comprises the steps of:
 (a)(1) connecting a resistor in series with said motor; and
 (a)(2) providing said first signal in response to a polarity of voltage developed across said resistor.

19. The method of claim 17 wherein step (c) comprises the step of:
 exclusive-ORing said first signal and said second signal to provide said control signal.

20. The method of claim 17 wherein step (d) comprises the step of:
 turning on a transistor connected between said first motor terminal and said second motor terminal.

21. For use with a controller and a device driven by an electric motor, said controller regulating the speed of said device by changing a drive signal provided to said electric motor, said electric motor having at least a first motor terminal and a second motor terminal for receiving said drive signal, a method for improving the regulation of said speed by said controller, comprising the steps of:
 (a) connecting a first resistor in series with said motor to form a first series circuit, a junction of said first resistor and said motor forming a first node;
 (b) providing a second series circuit of a second resistor, a second node, and a diode;
 (c) connecting said second series circuit in parallel with said first said series circuit; and
 (d) providing a control signal as a voltage difference between said first node and said second node; and
 (e) responding to said control signal by connecting a load between said first motor terminal and said second motor terminal.

22. The method of claim 21 wherein step (e) comprises the step of:
 turning on a transistor connected between said first motor terminal and said second motor terminal.

23. For use with a controller and a device driven by an electric motor, said controller regulating the speed of said device by changing a drive signal provided between a first output terminal and a second output terminal of said controller, said electric motor having at least a first motor terminal and a second motor terminal for receiving said drive signal, an apparatus for improving the regulation of said speed by said controller, comprising:
 means connecting said first output terminal to said first motor terminal;
 a first diode connected between said second output terminal and said second motor terminal, said first diode being forward biased when said drive signal is sufficient to cause said motor to drive said device;
 a first load resistor having a first end and a second end, said first end being connected to said first motor terminal;
 switching means responsive to a control signal for connecting said second end of said first load resistor to said second motor terminal;
 biasing means responsive to said drive signal for providing said control signal to said switching means when said drive signal is insufficient to cause said motor to drive said device; and
 a second load resistor connected between said first motor terminal and a node, said node being connected to said first output terminal and said first load resistor.

24. The apparatus of claim 23 wherein said switching means comprises a transistor.

25. The apparatus of claim 23 and further comprising:
 a switch for reversing connections to said first motor terminal and said second motor terminal.

26. The apparatus of claim 23 and further comprising:

a second diode connected between said first motor terminal and said second motor terminal, said second diode being forward biased and providing a load for said motor so that said motor provides a braking action when said motor is being turned in a reverse direction.

27. The apparatus of claim 26 and further comprising:
a third load resistor connected in series with said second diode.

* * * * *